US009019830B2

(12) United States Patent
DeLay et al.

(10) Patent No.: US 9,019,830 B2
(45) Date of Patent: Apr. 28, 2015

(54) CONTENT-BASED ROUTING OF INFORMATION CONTENT

(75) Inventors: John L. DeLay, Mason, OH (US); Edward R. Beadle, Melbourne, FL (US)

(73) Assignee: Imagine Communications Corp., Frisco, TX (US)

(*) Notice: Subject to any disclaimer, the term of this patent is extended or adjusted under 35 U.S.C. 154(b) by 1653 days.

(21) Appl. No.: 11/748,857

(22) Filed: May 15, 2007

(65) Prior Publication Data
US 2008/0285578 A1 Nov. 20, 2008

(51) Int. Cl.
| H04L 12/853 | (2013.01) |
| H04L 12/859 | (2013.01) |
| H04L 29/08 | (2006.01) |
| G06F 9/54 | (2006.01) |
| H04L 12/701 | (2013.01) |
| H04L 12/725 | (2013.01) |
| H04L 12/773 | (2013.01) |
| H04L 12/801 | (2013.01) |
| H04L 29/06 | (2006.01) |

(52) U.S. Cl.
CPC .......... *H04L 67/322* (2013.01); *G06F 9/546* (2013.01); *H04L 45/00* (2013.01); *H04L 45/306* (2013.01); *H04L 45/60* (2013.01); *H04L 47/10* (2013.01); *H04L 67/327* (2013.01); *H04L 65/4084* (2013.01)

(58) Field of Classification Search
None
See application file for complete search history.

(56) References Cited

U.S. PATENT DOCUMENTS

| 5,258,979 | A | 11/1993 | Oomuro et al. | |
| 5,699,355 | A | 12/1997 | Natarajan | |
| 6,157,950 | A * | 12/2000 | Krishnan | 709/223 |
| 6,222,841 | B1 * | 4/2001 | Taniguchi | 370/389 |
| 6,304,578 | B1 * | 10/2001 | Fluss | 370/413 |
| 6,556,548 | B1 | 4/2003 | Kirkby et al. | |
| 6,714,545 | B1 | 3/2004 | Hugenberg et al. | |
| 6,801,530 | B1 | 10/2004 | Brandt et al. | |
| 6,822,940 | B1 * | 11/2004 | Zavalkovsky et al. | 370/237 |
| 6,850,980 | B1 | 2/2005 | Gourlay | |
| 6,915,360 | B2 | 7/2005 | Karlsson et al. | |
| 6,928,053 | B1 | 8/2005 | Kadengal | |
| 6,954,798 | B2 | 10/2005 | Eastham | |
| 6,990,108 | B2 | 1/2006 | Karlsson et al. | |
| 7,023,825 | B1 | 4/2006 | Haumont et al. | |
| 7,093,275 | B2 * | 8/2006 | Birks et al. | 725/105 |
| 7,099,687 | B1 | 8/2006 | Mäkelä et al. | |

(Continued)

FOREIGN PATENT DOCUMENTS

| WO | WO 00/33535 | 6/2000 |
| WO | WO 01/74027 | 10/2001 |

(Continued)

OTHER PUBLICATIONS

International Search Report—4 pgs., Sep. 5, 2008, Harris Corporation.

(Continued)

*Primary Examiner* — Phirin Sam
*Assistant Examiner* — Tarell Hampton
(74) *Attorney, Agent, or Firm* — Tarolli, Sundheim, Covell & Tummino LLP

(57) ABSTRACT

A system to route media information content may include a router that analyzes predetermined content of a plurality of data packets of the media information content and prioritizes forwarding the plurality of data packets from the router based on applying at least one rule to the predetermined content.

34 Claims, 6 Drawing Sheets

(56) References Cited

U.S. PATENT DOCUMENTS

| | | |
|---|---|---|
| 7,103,667 B1 | 9/2006 | Bell et al. |
| 2002/0059274 A1* | 5/2002 | Hartsell et al. ............... 707/100 |
| 2002/0097675 A1* | 7/2002 | Fowler et al. ................. 370/230 |
| 2003/0112867 A1 | 6/2003 | Hannuksela et al. |
| 2003/0152097 A1 | 8/2003 | Makela et al. |
| 2003/0179707 A1* | 9/2003 | Bare ............................... 370/235 |
| 2003/0189946 A1 | 10/2003 | Yajnik et al. |
| 2004/0003096 A1 | 1/2004 | Willis |
| 2004/0010592 A1 | 1/2004 | Carver et al. |
| 2004/0037187 A1* | 2/2004 | Kondo et al. ............... 369/47.33 |
| 2004/0078809 A1 | 4/2004 | Drazin |
| 2004/0090914 A1 | 5/2004 | Briscoe et al. |
| 2004/0177017 A1* | 9/2004 | Yamamoto et al. ............. 705/35 |
| 2004/0194143 A1* | 9/2004 | Hirose ............................ 725/97 |
| 2005/0010653 A1 | 1/2005 | McCanne |
| 2005/0025105 A1* | 2/2005 | Rue ................................ 370/338 |
| 2005/0058146 A1* | 3/2005 | Liu et al. ....................... 370/412 |
| 2005/0152346 A1* | 7/2005 | Rabenko et al. .............. 370/352 |
| 2005/0157660 A1 | 7/2005 | Mandato et al. |
| 2005/0157735 A1* | 7/2005 | Kan et al. ...................... 370/412 |
| 2005/0175084 A1* | 8/2005 | Honda et al. ............. 375/240.01 |
| 2005/0222856 A1 | 10/2005 | Kilkki et al. |
| 2005/0262419 A1* | 11/2005 | Becker et al. ................. 714/758 |
| 2006/0047845 A1* | 3/2006 | Whited et al. ................ 709/231 |
| 2006/0126651 A1* | 6/2006 | Yu .................................. 370/404 |
| 2006/0164983 A1 | 7/2006 | Menth |
| 2006/0187830 A1* | 8/2006 | Nam ............................... 370/229 |
| 2006/0212426 A1* | 9/2006 | Shakara et al. .................... 707/3 |
| 2006/0262791 A1* | 11/2006 | Kadambi et al. .............. 370/389 |
| 2007/0006293 A1* | 1/2007 | Balakrishnan et al. .......... 726/13 |
| 2007/0083673 A1* | 4/2007 | Lara et al. ..................... 709/246 |
| 2007/0086669 A1* | 4/2007 | Berger et al. ................. 382/243 |
| 2007/0113139 A1* | 5/2007 | Ahn ............................... 714/748 |
| 2008/0019371 A1* | 1/2008 | Anschutz et al. ............. 370/394 |

FOREIGN PATENT DOCUMENTS

| | | |
|---|---|---|
| WO | WO 0189213 A1 | 11/2001 |
| WO | WO 03/067845 A2 | 8/2003 |
| WO | WO 2005/006419 A2 | 1/2005 |
| WO | WO 2005/074278 A2 | 8/2005 |
| WO | WO 2006/029297 A2 | 3/2006 |

OTHER PUBLICATIONS

PCT Written Opinion of the Int'l Search Report—6 pgs., Sep. 5, 2008, Harris Corporation.

Lixin, Gao and Towsley, Don, "Supplying Instantaneous Video-on-Demand Services Using Controlled Multicast", In Proceedings of the IEEE International Conference on Multimedia (Jun. 1999), pp. 1-5.

\* cited by examiner

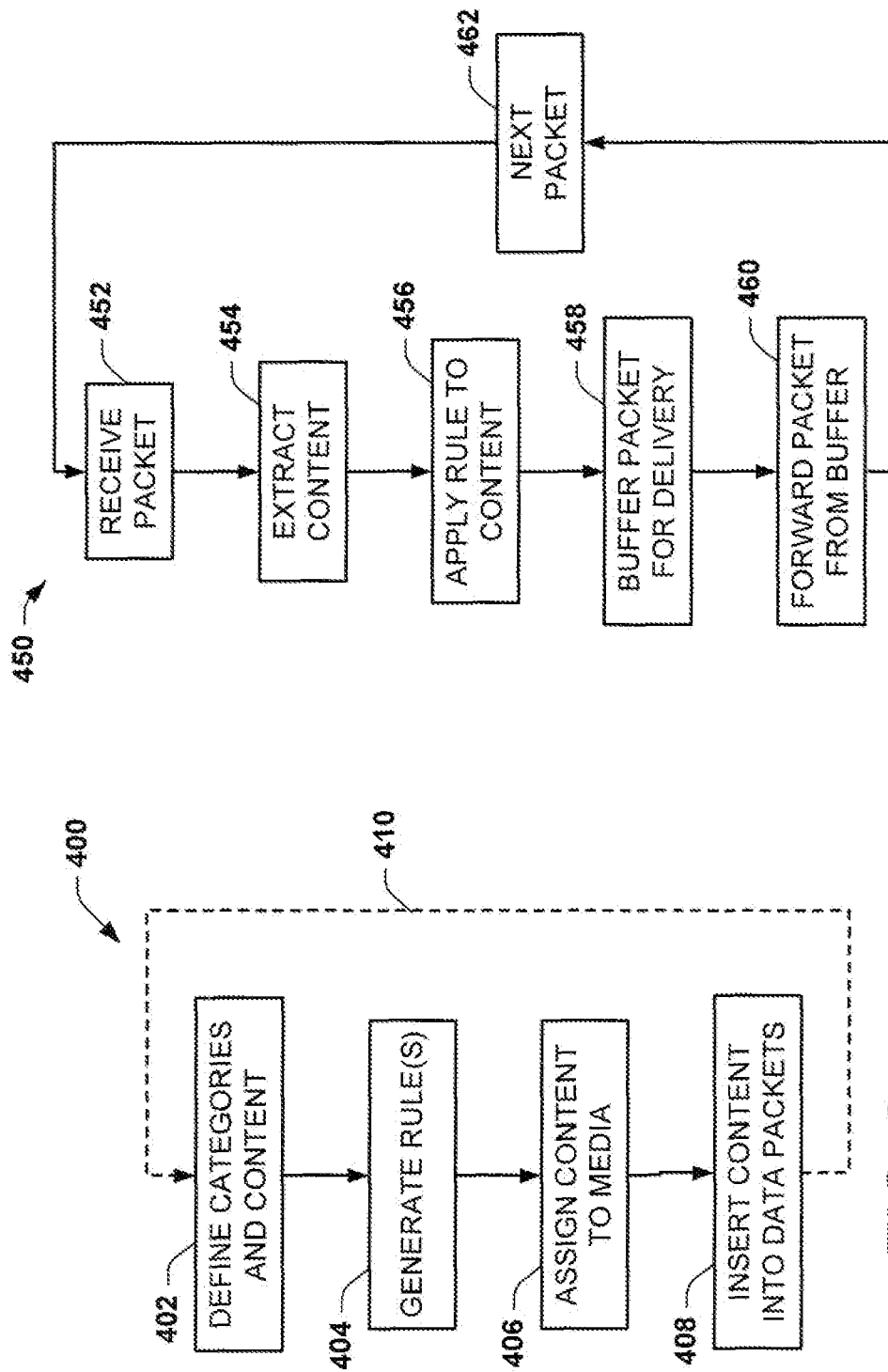

CONTENT-BASED ROUTING OF INFORMATION CONTENT

TECHNICAL FIELD

The present invention relates generally to a routing and, more particularly, to systems and methods that can perform content-based routing of media information content.

BACKGROUND

Various systems and methods have been developed to provide video on demand (VOD) services to allow users to select and watch information content (e.g., audio, video and audio-video) content over a network. Some VOD systems stream content, which allows viewing while the video is being downloaded. Other types of systems enable content to be downloaded and stored, such that the program is brought in its entirety to a set-top box prior to viewing. In the example of streaming media, the multimedia content can be sent to a user by a variety of content delivery methods, such as unicasting or multicasting. Unicast is the sending of information packets to a single destination. In contrast, multicast relates to the delivery of information to a group of destinations simultaneously. When content is multicast, it is possible that copies of the content can be made such as when links to one or more of the destinations split.

Many existing VOD system architectures are inflexible and, as such, are unable to adapt adequately to the changing business needs of the services provider. Consequently, many system designs require extensive capital expenditures on the infrastructure to accommodate peak service demands. Accordingly, improvements in functionally for these and similar systems are desired.

SUMMARY

The invention relates generally to a system and method for implementing content-based routing of media information content, such as audio, video and audio-video content. For example, a system may include a router than analyzes content of video-on-demand data (e.g., metadata in data packets) and prioritizes forwarding the video-on-demand data for one or more users based on applying one or more rules to the content in the data packets. The rule(s) can include an optimization of resources for a service provider, such as optimization of revenue, physical resources or a combination thereof. The content for multiple user-connections can also be analyzed to ascertain a pattern to which one or more rules can be applied for controlling how content is distributed (e.g., a rule can establish under what circumstances to switch from a first type of streaming video to a second type of streaming).

As a further example, known content can be inserted into each packet such as to identify one of a plurality of categories to which the data packet belongs. Alternatively, the known content can be pre-identified and employed to determine which category the data packet belongs. Since the content or metadata in each data packet is "known" by the router, the router can employ one or more rules to prioritize routing or otherwise control distribution of the respective data packets, such as from the router to an associated network.

One aspect of the invention provides a system to route media information content. The system may include a router that analyzes predetermined content of a plurality of data packets of the media information content and prioritizes forwarding the plurality of data packets from the router based on applying at least one rule to the predetermined content.

Another aspect of the invention provides a system to perform content-based routing of media information content. The system may include a router that extracts predetermined content from a plurality of data packets corresponding to media information content. The router employs a rules engine to apply at least one rule to the extracted predetermined content to determine an output prioritization for forwarding each of the plurality of data packets from the router. A control system that defines the at least one rule applied by the rules engine according to at least one business objective (e.g., revenue, resources or the like).

Yet another aspect of the invention provides a system for performing content-based routing. The system includes means for extracting predetermined content at a router from a plurality of data packets. The system also includes means for applying at least one rule to the extracted predetermined content to determine a category associated each of the plurality of data packets. The system also includes means for forwarding each of the plurality of data packets from the router based on a priority assigned to the determined category.

Still another aspect of the invention provides a method for performing content-based routing. The method may include receiving at a router a plurality of data packets of media content information provided by a source. Predetermined content is extracted from each of the plurality of data packets applying at least one rule to the extracted predetermined content. Each of the plurality of data packets is buffered for delivery from the router with a priority according to a result of the application of the at least one rule. Each of the plurality of data packets is forwarded from the router to a network according to the priority.

BRIEF DESCRIPTION OF THE DRAWINGS

FIG. 8 is a flow diagram of a method that can be utilized to manage content that is provided for enabling content-based routing according to an aspect of the invention.

FIG. 9 is a flow diagram of a method for implementing content-based routing according to an aspect of the invention.

DETAILED DESCRIPTION

Figure 1:
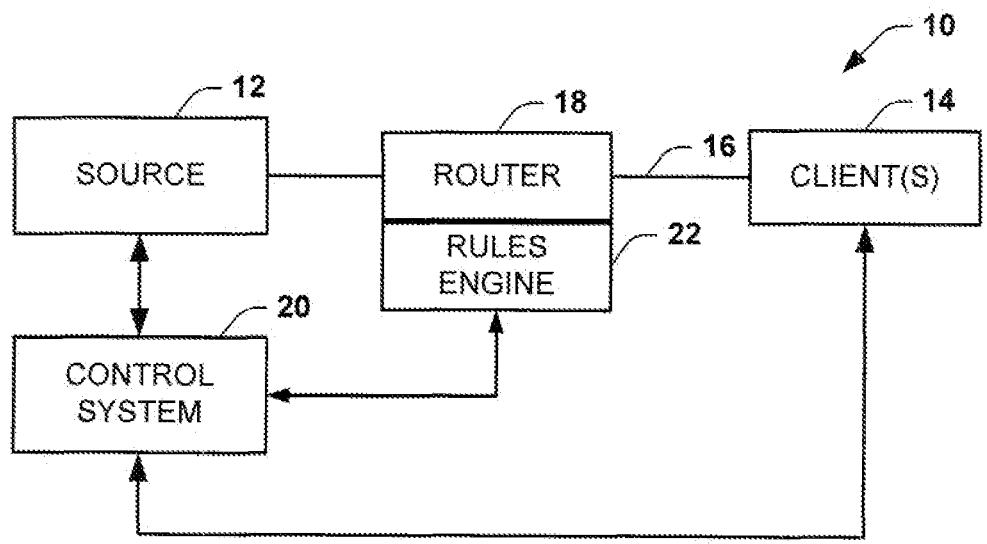
FIG. 1 depicts an example block diagram of a system for implementing content-based routing according to an aspect of the invention.

The invention relates generally to a system and method for implementing content-based routing of media content, such as audio, video and audio-video content. The systems and methods described herein can control routing of data packets to one or more subscribers according to predetermined content in each of the packets. Because the predetermined content is known, a router can apply one or more rules to the known content of a given data packet and route each packet accordingly. Such content-based routing enables efficient use of resources to achieve related business objectives. As used herein, the term "business" is intended to relate to more than commercial or revenue generating considerations. For example, systems and methods described herein are equally applicable to military and government applications, such as where the "business" may or may not involve generation of revenue.

As will be appreciated by those skilled in the art, portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Turning to FIG. 1, an example system 10 for implementing content-based routing is depicted. The system 10 includes a source 12 that is configured to provide data packets corresponding to selected media information content for distribution to one or more clients 14 via a network, schematically indicated at 16. The source 12 can include a server that is programmed and/or configured to select and serve the media information content for distribution on the network 16 via the router 18. The media information can include any number of one or more media offerings, such as audio, video and audio-video programs (e.g., movies, televisions or other media content). The media offerings can be stored in one or more data stores (not shown) accessible by the source 12, such as may be compressed or uncompressed data. Those skilled in the art will understand and appreciate various types of magnetic, optical or other types of storage media that can be utilized for storing media content data. Alternatively or additionally, the source 12 can include a live feed of multimedia data packets, such as a digital video broadcast (DVB) stream. The live feed of multimedia data can be received from separate source via a wireless link (e.g., from a satellite ground antenna) or via a physical connection. For example, the media source 12 can serve up a selected program in response receiving a session request that identifies the selected program and the destination(s) of the data packets for the program.

The system 10 also includes a router 18 that is programmed and/or configured to route data packets from the source 12 to the clients 14. According to an aspect of the invention, the router 18 employs content-based routing to control forwarding the data packets to the clients 14. The router 18 can be any device or circuitry programmed and configured to forward the data packets from the media source 12 across the network 16 toward their destination(s). The network 16 can be any type or configuration of communication network (or a combination of networks) that can support communication of data packets (see, e.g., FIG. 3). It will be appreciated that the network may provide a physical (electrically conductive or optical) connection to the clients 14, a wireless connection, or a combination of wireless and physical connections. Various network architectures and protocols can be implemented to enables transmission of the media content as packets, such as including internet protocol (IP) and asynchronous transfer mode (ATM) networks to name a few. In such a packet network, intermediate "reachback" nodes with a set data lifetime can be used such that if packets in a multicast operation are lost, corrupted or otherwise unusable by a downstream user, they can be requested for re-transmission from a node (or server) topologically local to the re-transmit request. This prevents re-transmissions from a root or source node "blocking" many users from receiving their real-time content.

Additionally, the source 12 and the router 18 can support various protocols, such as may vary according to system requirements. For example, the system 10 can employ a datagram protocol, such as the User Datagram Protocol (UDP), for sending the media stream as a series of data packets. Other protocols that can be employed to stream media in the system include the Real-time Streaming Protocol (RTSP), Real-time Transport Protocol (RTP) and the Real-time Transport Control Protocol (RTCP). The latter two are built on top of UDP. Other, generally more reliable protocols, such as the Transmission Control Protocol (TCP), can also be utilized to guarantee correct delivery of each bit in the media stream.

As mentioned above, the source 12 provides the multimedia program to the router 18 in the form of data packets. According to an aspect of the present invention, each packet includes predetermined (or known) content or metadata based on which the router 18 controls routing of the data packet from the router to the client(s) 14. For instance, the content or metadata in each data packet can define a predetermined routing category for each respective packet. The routing category further can represent or be associated with a known or predetermined economic category (e.g., a value) for the information content being streamed.

The predetermined content or metadata can be stored as part of the multimedia program content in memory associated with the source 12. Alternatively, the content or metadata can be added (e.g., on the fly) to each data packet as the packets are constructed for distribution by the media source 12. For example, the content or metadata can be implemented as one or more fields in a header of a predetermined layer (e.g., in the header of the network or transport layer) of OSI model. The content or metadata can be pre-assigned to each program by a control system 20, such as based on content assignment data associated with the predetermined content or metadata. A client 14 thus can select a desired multimedia program, such as a movie or other program, having the pre-assigned category or value. Each program may be available to the client as any number of one or more of the pre-assigned categories. It will be appreciated that event the predetermined content in the respective packets is known, this does not necessarily imply the destination and routing priority for any packets are predetermined for delivery or distribution in the system 10. That is, the routing and prioritization is determined based on analyzing the content in the packets, such as described herein. It will be further appreciated that the approach described herein is particularly useful for a constrained network.

As one example, a given media program may be available in two or more different categories for selection by the one or more clients 14. For instance each version or category of a given program can have a unique identifier for use within the system 10. The unique identifier can correspond to metadata in each of the data packets for the given program. In response to a user selecting a particular program, the media source 12 provides corresponding packets to the router 18, each packet including metadata for the appropriate identifier.

The router 18 extracts and analyzes the content header or metadata from each data packet to determine a category for each data packet. The content or metadata can be extracted from each packet by the router 18. As used herein, the term "extract" and variations thereof, as applied to functionality of the router, does not require that content or metadata be removed from the data packet, but instead refers to the process of taking or copying information. That is, when the router 18 extracts content from the data packets, the content either may be removed from the data packet or the content may remain in the data packet that is passed to the network 16.

To perform the content-based routing, the router includes a rules engine 22 that determines a routing priority based on applying one or more predetermined rules to the content or metadata in each data packet. For example, the rules engine 22 can be preprogrammed to determine a category for each data packet according to the content or metadata, such as provided by the control system 20. In this way, the multimedia, programs can be forwarded from the router 18 to the network 16 with a priority defined by the determined category of the respective data packets.

If "new" content is available to the network, content-based routing is still supported for existing as well as new content. However, in this case, the business system can determine a relevance of such new content to the downstream users, such as to each individual user or to one or more groups of users. For "known content" provided to users the relevance score might be consistently unity. However, for new content, based on say subject matter preferences the score can range from 0 to 1 (inclusive). This score can be used to prioritize bandwidth usage when offering or distributing content which consumes potentially revenue generating network resources. Alternatively or additionally, the relevance score can be provided in the data or otherwise be employed by the rules engine to control routing of the new content.

By way of further example, a given program may be made available for selection and viewing by the clients 14 at two more different currency levels (e.g., $1.00, $4.00 and $7.00). Each currency level of the given program can correspond to a different prioritization category, which can be encoded by corresponding metadata in each data packet. In response to a user selecting the program having one of the different currency levels, the source 12 provides the router 18 with the data packets for the selected program at the selected currency level. Each of the data packets thus includes the content or metadata that identifies (or encodes) the respective packet as having a category assigned to the selected currency level. The router 18 extracts the content or metadata from each packet. The rules engine 22 in turn applies one or more rules to the content header or metadata to prioritize how the data packets from the source 12 are forwarded from the router 18 to the network 16. In this way, a given packet having a higher economic return to the service provider can be afforded a higher priority for distribution to the client 14. For instance, the router 18 can implement flow control that guarantees content in one category is given a connection priority that supersedes or is given a higher connection priority relative to data packets having a different assigned category (e.g., corresponding to a lower economic value).

Those skilled in the art will understand and appreciate various types of rules that can be established to control forwarding data packets from the router 18 to the network 16. Additionally, it will be understood and appreciated that the control system 20 can dynamically modify the rules implemented by the rules engine 22 as well as apply real-time adjustments to the content or metadata in the data packets. For example, the rules and metadata can be modified as a function of network resources as well as demand for multimedia content, by the one or more clients 14.

Additionally, since rules or categorization of multimedia content may change during system operation, including the cost or value associated with available programming, the control system 20 can further update program offerings made available to the clients 14, such as by modifying an electronic program guide (EPG) running at the clients 14. For instance, the EPG for each individual subscriber or groups of subscribers can be programmed to dynamically modify product offerings available to such subscribers. The business system and EPG control can cooperate to determine (e.g., deterministically and or statistically) an expected relevance of media information content, such as programs, trailers and the like. The control system 20 can also manage the content or metadata that is provided with each of the packets with the media source 12 as well as define the rules that will be applied by the rules engine 22. Consequently, by controlling the rules, packet priority and priority connection for different multimedia content can be tied to the economics or value. In addition, the content routing rules can be responsive to "time-of-day" or localized demands which can affect the global optimization for network utility for the service provider. That is, the content header or metadata that utilized by the router 18 into each packet can correspond to an evaluation of the content, such that a flexible set of business rules can be utilized for the distribution of content in the system 10, such as to optimize resources and revenue for a service provider.

Flexibility is further added by allowing some local distribution control based routing in the local domain of control for a node. Localized decisions can be passed to "super nodes" controlling multiple local nodes, etc. to provide a globally optimized solution for network utility. This represents a globally optimized network with locally optimal allocations of resources. This is valuable since certain local nodes may be of more "value" to the service provider at certain times which can not be foreseen at inception. That is the distribution and content-based routing can be employed to distribute available media information content to downstream nodes, such as to facilitate subsequent downstream distribution of such content to the end users or other further downstream local nodes. In this way, system resources can be further optimized.

The content header or metadata further can be analyzed (e.g., by the router and/or by the control system) over a period of time to ascertain viewing patterns for programs and subscribers as well as monitor resource utilization for the network as well as for respective clients 14. Additional rules can be designed to trigger or adjust how data packets for programs are distributed in the system 10 based on the patterns determined from analyzing such content. For example, such pattern based distribution can utilized methods from the field of statistical learning, such as Bayesian methods, Dempster-Shafer reasoning, or fuzzy decision making.

Figure 2:
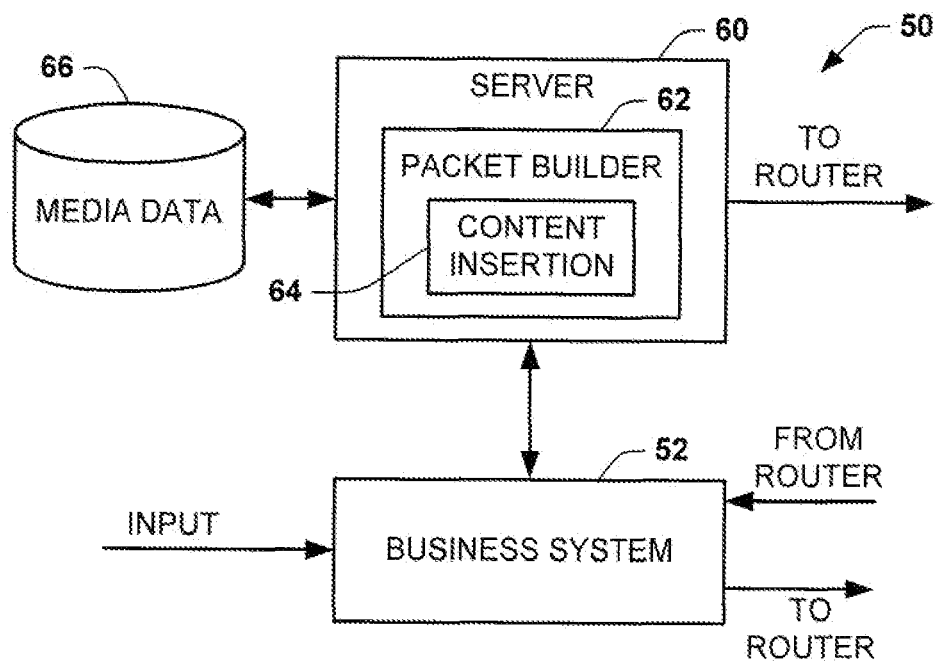
FIG. 2 depicts part of a system that can be employed for inserting content into data packets to enable content-based routing according to an aspect of the invention.

FIG. 2 depicts an example of a source 50 that can be programmed to provide media information as data packets to facilitate content-based routing according to an aspect of the invention. As shown in FIG. 2, the source 50 can be coupled to a business system 52 that can implement functions and methods utilized for assigning content or metadata to enable the routing approach. For example, the business system 52 can determine a number of two or more different categories of program content, each such category having a category code or identifier (e.g., a multi-bit identifier or metadata).

The available category or categories assigned to a given program can be fixed over a time period. Alternatively, the business system 52 can dynamically adjust the categories of the programming being offered to the subscribers. For instance, the business system 52 can change the category of a given program based on subscriber demand for such program or based on a temporal property (e.g., whether it is a new release or late breaking or important information) of the program itself or based on a combination of factors recognized by the business system. As described herein, the data packets provided by the server 60 thus can be routed with a prioritization that varies according to the assigned category.

The business system 52 provides the server 60 with metadata that represents each category. For instance, the business system 52 can assign each category a multi-bit category identifier having a value. The business system 52, being aware of all program offerings available at the source 50, can also control which one or more categories each program is to be made available to subscribers within the system 50. The business system 52 thus provides the server 60 with assignment data that indicates how the metadata, and hence the categories, are to be applied to the programs. The business system 52 can receive an input, such as via user interface (not shown), to control how the categories are to be applied to the program available from the source. Alternatively, the assignment data can be generated in real time by an optimization engine or other software component to control assignment of the metadata at the server 60.

As described herein, the business system 52 can also manage the subscribers' EPGs so that each program can be selected by a subscriber at one or more pre-assigned category. The business system 52 can also establish rules to control routing of data packets from the server 60 to the subscribers based on the metadata generated by the business system. For example, the business system 52 can establish rules so that higher revenue programs or more important programs can be afforded a higher routing prioritization by forwarding data packets with a priority based on their respective category. As a result, the business system 52 can synergistically manage what programs are available at the subscriber EPG as well as the categories of programming at the source 50 to maximize resources and revenue according to business model employed by the service provider.

To enable such content-based routing, the server 60 is programmed to insert metadata into data packets based on the assignment data provided by the business system 52. For example, the server 60 can implement a packet builder 62 to construct packets for multimedia programs being served by the server 60. The packet builder 62 farther can implement a content insertion component 64 for inserting the appropriate metadata into data packets for each identified program. Thus, each data packet provided by the server 60 to the router (not shown) includes corresponding metadata representing (or encoding) the category assigned by the business system 52.

By way of further example, the packet builder 62 and content insertion can generate a corresponding sequence of packets for each program that can be stored in memory as the multimedia data 66. A given program can be assigned any number of one or more categories such that multiple instances of the same program can be packetized with different metadata such that more than one sequence of packets may be stored as the multimedia data 66 for each respective program. The server 60 can retrieve stored packets from memory that can be provided to the router in response to a user selecting a given program having a pre-assigned category. Alternatively, the packet builder 62 and content insertion component 64 can packetize a given program stream on-the-fly such as by inserting the category metadata into each packet in response to user requests for a given multimedia program at a particular category. Since the rules and metadata can be modified on-the-fly, the business system 52 can also provide the router with appropriate rule updates in real time to enable appropriate processing of the content served up by the server.

It will be understood and appreciated that the packet builder 62 can provide certain programs or otherwise unspecified programs with predefined metadata, corresponding to a default category, which can be inserted into data packets for such programs. As a further example, a featured multimedia program can be stored in the multimedia data 66 or be provided or received from another source, such as described herein.

Figure 3:
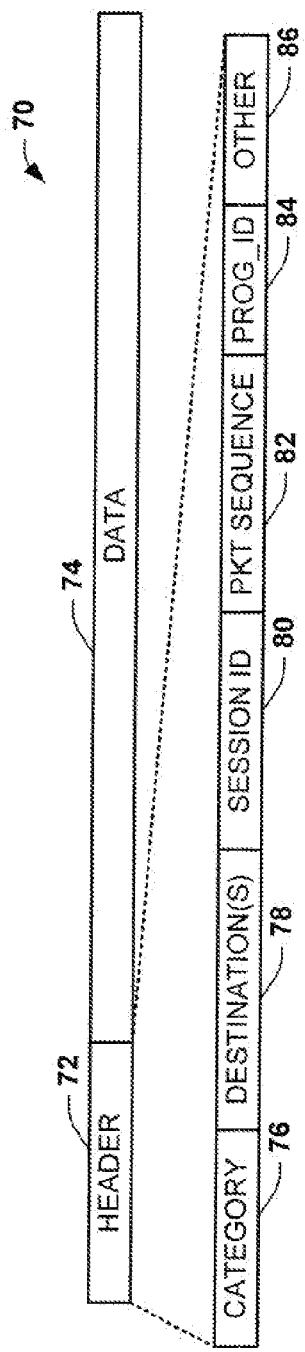
FIG. 3 depicts an example of a data packet that can be routed in a system operating according to aspect of the invention.

FIG. 3 depicts an example of a data packet 70 that can be provided by a source of multimedia data (e.g., by the server 60 of FIG. 2 or source 12 of FIG. 1). In the example of FIG. 3, the data packet 70 includes a header 72 and a data portion 74. The header 72 includes a plurality of predefined data fields which can vary according to the communication protocol and system requirements. To enable content-based routing, the header 72 includes a category field 76, such as in the form of metadata having a value that identifies the assigned category for the data packet 70. As mentioned herein, the category can be assigned by business system or be a default category if not specified by the business system. The header 72 can also include a destination field 78 that identifies one or more destinations to which the packet is to be forwarded. For instance, the destination field 78 can include a multicast or unicast address to which a given packet is being streamed. Typically, each data packet 70 for a given program to a given destination(s) will have the same value for its category field 76 so that the data packets are routed with the same priority. However, it is contemplated that in certain circumstances different data packets for the same program being streamed to a given subscriber or group of subscribers might be assigned to different categories and, thus, include different metadata in the category field 76.

The header 72 further can include a session identifier (ID) 80 that identifies the particular program and the connection between a server and client, such as the set top box to which the packet is being routed. The packet header 72 can also include a packet sequence identifier 82 that identifies the sequence of a particular packet so the packets can be ordered appropriately in sequence for processing and presenting the program at the set top box. The header 72 can also include a unique program identifier (PROG_ID) field 84 that enables the programs to be distinguished. For instance, the program identifier can include data that identifies one or more attributes (e.g., title, genre, producer, one or more actors and the like) of the program.

Those skilled in the art will understand and appreciate various other types of information (indicated as the other field 86) that can be implemented in the header 72 of the data packet 70. Additionally, while the metadata for enabling content-based routing has been described as being in a category field of the packet header 72, it will be understood and appreciated that such metadata can be inserted into other fields of the data packet, including the data field 74 or elsewhere in the packet. As one example, the category of a given data packet might be determined (e.g., by an intelligent router) based on analysis of content in one or more other fields of the data packet. That is, the content-based routing need not be restricted to the manner in which the category is identified in the data packets being routed.

Figure 4:
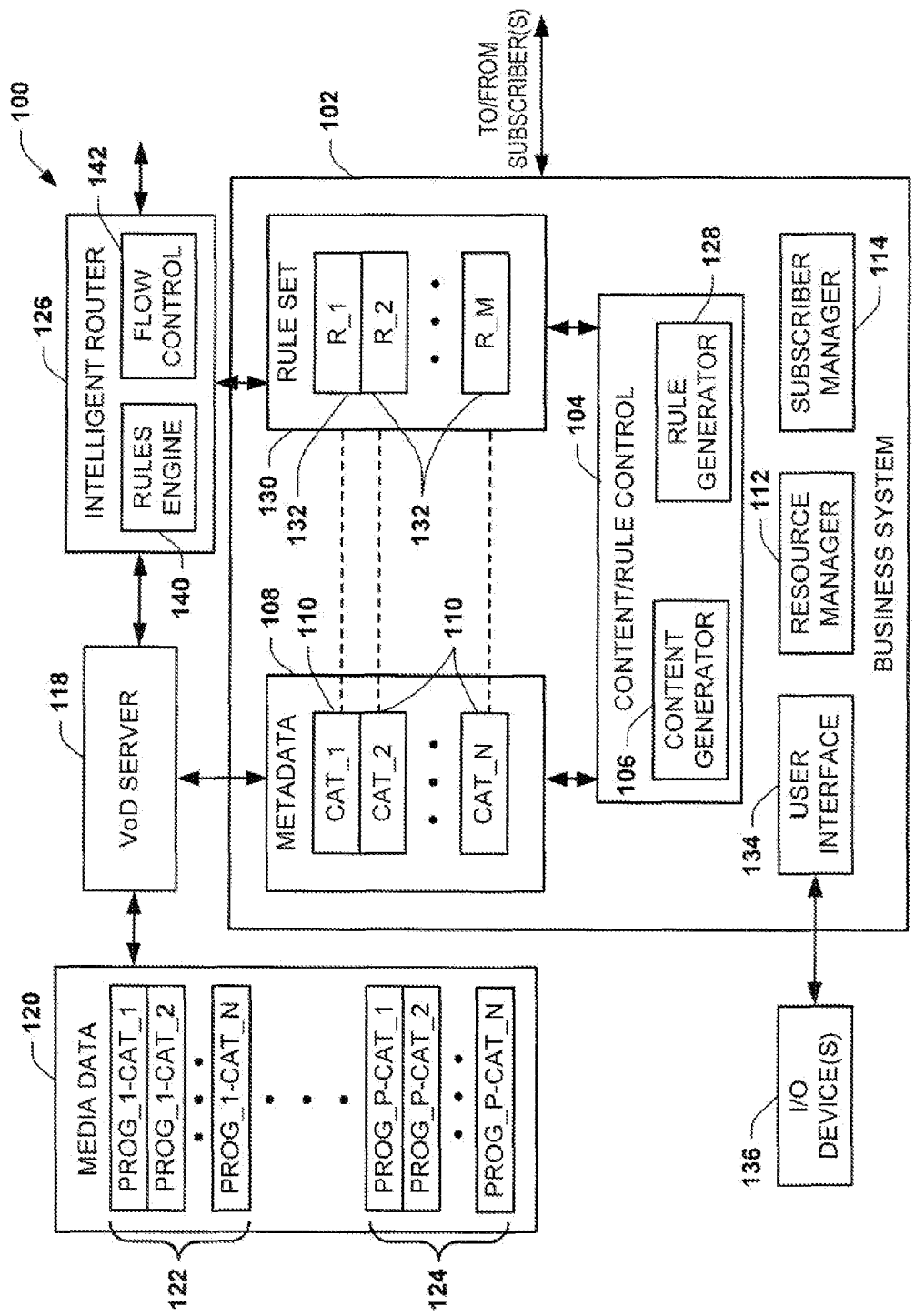
FIG. 4 depicts an example of a system that can be employed for implementing content-based routing of program content according to an aspect of the invention.

FIG. 4 depicts an example of a video on demand (VoD) system 100 that can implement content-based routing for multimedia program content, such as audio-visual data (e.g., movies, special event features and the like). While the example of FIG. 4 will be shown and described with respect to implementing content-based routing for a VoD system, those skilled in the art will understand and appreciate have similar content-based routings scenarios that can be implemented for this and other types of multimedia and program content.

The system 100 includes a business system 102 that is programmed to control the overall operation of the system 100, such as may be at ahead end of a service provider. The service provider can be a cable provider, a satellite provider or other content provider for a plurality of subscribers. The business system 102 includes a content/rule control block 104 that is programmed to control routing and distribution of programming for the system 100. The content/rule control 104, for example, defines parameters and rules to control routing and distribution of programming. The content/rule control 104 can include a content generator 106 that is operative to generate metadata 108 that can include a plurality of category identifiers 110. For instance, the category identifiers are indicated at CAT_1, CAT_2, through CAT_N, where N is a positive integer denoting the number of available categories. The category identifiers can be unique multi-bit values inserted into respective data packets, as content, to identify an associated level of priority or importance for each respective data packet in the system 100. The category identifiers 110 thus can be employed to control routing of program content being delivered in the system 100, such as by prioritizing data packets according to their respective category identifiers.

The business system 102 can also include a resource manager 112 that manages the use of system resources, including network resources (e.g., bandwidth), program distribution, and economic resources for the system. The resource manager 112, for example, can determine and assign different values to each available program, which value further can differ as a function of its assigned category or categories. The value assigned to a given program and/or to a particular method of routing such program can correspond to a monetary value (e.g., the cost paid by a subscriber to receive the program). Additionally, the cost may relate to a valuation of something other than revenue for a provider of the media content, which valuation may vary according to the context in which the system 100 is implemented. For example, the system 100 can be employed in government or military context, including for civil government and military applications. In the government context, the value or cost associated with a given program or category of program may correspond to an importance to the end user (e.g., the utility or objective associated with receiving program content) or other combination of one or more factors deemed relevant to the distribution of the program.

The resource manager 112 can function in cooperation with a subscriber manager 114 to ensure that the EPG at subscriber sites remains current, including available programming and the associated cost of receiving such programming. Each category for a given program may have the same value to each subscriber. Alternatively, the same category for different programs further can be assigned different values to subscribers according to the particular program to which the category is associated. As another alternative, the value can define temporal categories associated with content delivery, such as how immediate the delivery is to be. For example, one user may be willing to wait for delivery of a given program for up to 24 hours for a lower cost, whereas a different user may be willing to pay a premium for immediate delivery. That is, the cost to receive a program may be tied to its category or the cost may be independent of its category. Those skilled in the art will understand and appreciate various approaches and cost or value structures that can be utilized by the resource manager 112 for assigning values and cost for receiving different program content. Regardless of the cost structure utilized within the system 100 and the manner in which such information is provided to the subscribers (not shown in FIG. 4), the various categories can be encoded as content identifiers 110 that are inserted as metadata into data packets of the programming being provided in the system 100.

For example, the business system 102 can provide the metadata 108 and assignment data to a VoD server 118. The VoD server 118 can run functions or methods for inserting the category identifiers 110 into data packets associated with media data 120 according to the assignment data provided by the business system. As shown in the example of FIG. 4, the media data 120 can include any number of one or more programs 122 and 124, indicated as PROG_1 through PROG_P, where P is a positive integer denoting the number of different media programs that can be provided via the system 100. Additionally, in the example of FIG. 4 each program 122-124 can be stored with an associated category identifier 110. Thus, as depicted in FIG. 4, PROG_1 is provided with N different categories and PROGRAM_P also has N categories. Alternatively, different programs can have different numbers of one or more categories, such as may vary based upon program demand or other circumstances determined by the business system 102. Those skilled in the art will appreciate that there can be any number of programs in the media data 120 and that each program can be made available to subscribers at one or more different categories.

As a further example, each program having a given category can be assigned a unique identifier within the system, such as a uniform resource indicator (URI) or a uniform resource locator (URL). The unique identifier is used to enable a given subscriber to select a desired program having an associated given category. The VoD server 118 in turn serves up the program data as a plurality of packets, each packet containing the metadata (e.g., the category ID) for the category of the program that was selected. The server 118 provides each of the packets as streaming data to an intelligent router 126.

To control the distribution and prioritization for the various unicast and multicast streams, the content/rule control 104 also includes a rule generator 128. The rule generator 128 is programmed to generate a rule set 130, which may include any number of one or more rules 132. In the example of FIG. 4, the rule set 130 is shown as including a plurality of rules 132, indicated at rule R_1, R_2 through R_M, where M is a positive integer denoting the number of rules. The rules 132 can be generated to achieve any one or more business objective. For instance, business objectives may include optimization of revenue, efficient use of system resources, quality of services or any combination of these or other relevant considerations.

As an example, the rule generator 128 can be programmed to generate the rule set 130 in a predetermined format, such as an XML document according to a predefined XML schema. For instance, one or more XML rule set templates can be provided which can be modified by a user, such as through a user interface 134 associated with the business system 102. A user can employ an input/output (I/O) device to interact with the user interface (e.g., a graphical and/or text based user interface) to enter or modify rules in a given template for populating the rule set 130. Those skilled in the art will understand and appreciate that the rule set 130 and the various rules 132 can be implemented in other formats, which can be any known, proprietary or yet-to-be developed formats. Additionally or alternatively, the rule generator 128 can be self-promulgating, such as by populating the rule set 130 based on system operation. For instance, the rule generator 128 can generate one or more rules 132 or modify existing rules based on predetermined criteria, such as may include the resources available in the system, subscriber demand, or program content that is added to the available offerings (e.g., the media data 120) within the system 100.

The intelligent router 126 includes a rules engine 140 that employs one or more of the rules 132 provided by the rule generator 128. The router 126, for example, is programmed with a packet sniffer that is operative to detect the category identifiers 110 in each packet. The rules engine 140 applies the rules 132 to the detected category for routing the packet according to its respective category. The rules engine 140, for example, can place each data packet into a respective output queue of an output buffer according to its assigned category determined from the category identifier in the data packet. As a further example, the output buffer can include a plurality of queues, each defining a particular prioritization for forwarding data packets to an associated network (not shown).

The router 126 further can employ flow control 142 that is programmed and/or configured to forward the packets from the output buffer according to a predetermined flow control algorithm. For example, in response to detecting a given category for a plurality of packets, each packet can be placed into a queue consistent with its category as defined by the rule set 130. Flow control 142 can in turn route respective packets from the router 126 to the network at a prioritization that varies according to which queue the packet resides. The flow control 142 further can implement load balancing to ensure appropriate distribution of data from the various queues according to their level of priority.

By way of example, if a user subscriber selects a program having a high priority category, such as by agreeing to pay a premium cost for such program, the rules engine 140 will detect the appropriate category and route the data packets for the selected program into a high priority output queue, such that the flow control 142 will route the program to the user with a priority connection that is higher as compared to lower priority packets, which will be routed with typically a significantly greater amount of delay. By prioritizing the connection, a user can, in response to agreeing to pay a premium for a given program, receive the program in an expedited manner compared to a lower priority category of the same or a different, program. Additionally, it is contemplated that certain categories of programs can require forwarding supplementary programs (e.g., trailers, commercials) prior to streaming the selected program.

It will be understood and appreciated that regardless of the priority, the intelligent router 126 can maintain a constant bandwidth associated with each stream of packet data, such that the connection priority (e.g., how quickly resources are allocated to establish a connection and begin forwarding program data packets) that varies according to the category of selected program. The intelligent router 126 may also adjust the bandwidth for a given program according to the category ID in the data packets for such program. For instance, a high definition program may be assigned a category that requires an increased bandwidth for its data packets. Those skilled in the art will understand and appreciate that the content-based routing approach described herein enables an optimization of both network resources and revenue for the provider of the system 100.

By way of further example, assuming there are initially three different categories of program content, (e.g., CAT_1, CAT_2, CAT_3) in a bandwidth limited scenario (e.g., the bandwidth allocated for a given category or all categories of programming is nearly used up), the resource manager 112 can, in response to detecting the bandwidth utilization in the system 100, cause the content manager to remove or suspend a particular category from availability to the subscribers in the system 100. The removal or suspension of a category can be temporary or it may be permanent depending upon system requirements. Concurrently with (or in advance of) categories being removed or suspended, the business system 102 further can implement changes to subscribers EPG's, such as described herein.

As a further example, instead of suspending or removing a particular category of program content from distribution in the system 100, the rule generator 128 can dynamically modify one or more of (or add a new rule to) the rules 132. For instance, a rule can be programmed to control distribution of the particular category to achieve a desired effect on distribution of data packets according to the content (e.g., metadata) in the data packets. As one example, rules can be generated to change the priority of one or more categories of data packets. Rules can also be generated to change the manner in which the data packets having a particular category ID are distributed. That is, the resource manager 112 determines circumstances exist for switching from a first type of streaming to a second type of streaming. The router 126 may cooperate with the source of media content, namely the VoD server 118, to effect the change in content distribution. For instance, the resource manager 112 can provide instructions to the router 126 and/or the VoD server 118 to effect a change from unicast streaming for a given category to a corresponding broadcast or multicast streaming for the given category. Alternatively, a the resource manager 112 may effect a switch from broadcast or multicast streaming to unicast streaming of selected media information content. As described herein, such changes can be implemented by re-defining the meaning of the respective category according to the rules 132 implemented for performing the content-based within the system 100.

Figure 5:
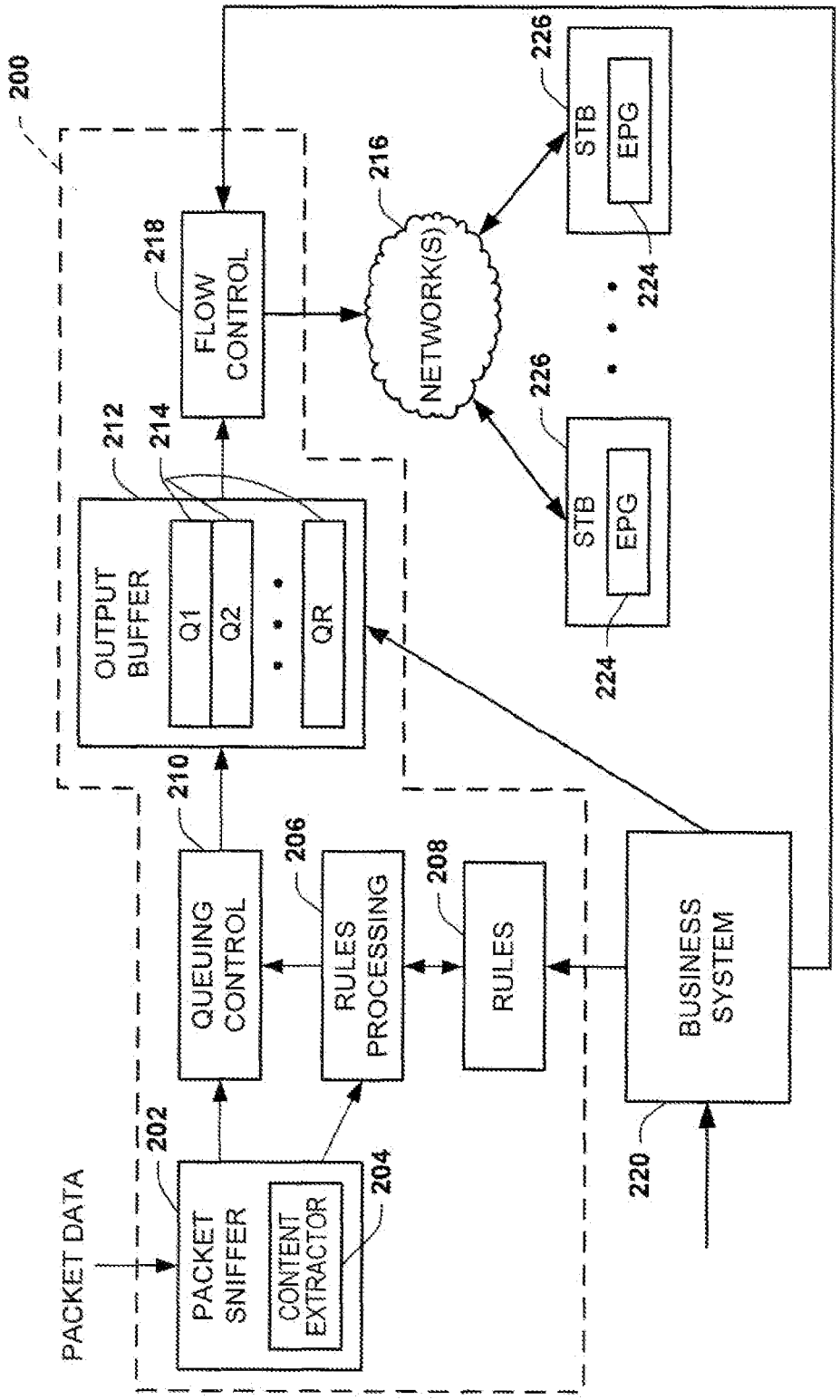
FIG. 5 depicts an example of a router that can implement content-based routing according to an aspect of the invention.

FIG. 5 depicts an example block diagram of a router 200 that can implement content-based routing according to an aspect of the invention. The router 200 receives data packets from a source of multimedia programming, such as a server or other source as described herein. The router 200 is programmed to analyze predetermined content (e.g., metadata) in each of the data packets and to perform content-based routing according to the content that is analyzed. Since the router 200 is aware of different types of content that can be included in the data packet, the router can apply predefined rules that determine how to route each packet based on the predetermined content.

In the example of FIG. 5, the router 200 includes a packet sniffer 202 that is operative to sniff an input steam of packet data. The packet sniffer 202 can be implemented as a software program running in the router 200 that can detect and capture each respective data packet. The packet sniffer 202 further can include a content extractor 204 that can detect and extract the predetermined content or metadata, such as can be inserted into the packet as one more fields that identify a respective category for the packet. The packet sniffer 202 can provide the extracted metadata to a rules processing component 206 that is operative to apply one or more of a plurality of rules 208.

The rules 208 can be programmed to control distribution of the data packets or otherwise be employed to help control utilization of system resources based on the content from the received data packets. As an example, each rule 208 can have a condition part (e.g., a Boolean expression), which, if satisfied, results in a predefined function or operation being performed. For example, one or more rules can be employed to determine a prioritization of the data packets being forwarded from the router.

In the example of FIG. 5, the rules processing component 206 informs or instructs a queuing control block 210 to control placement of respective data packets into an output buffer 212 based on the application of the rules 208 to the predetermined content (e.g., metadata). That is, the rules processing component 206 can apply one or more rules 208 to the content extracted from a given data packet and instruct the queuing control 210 to place the given data packet in a particular queue 214. The output buffer 212 can have any number of one or more queues 214, indicated at Q1, Q2 through QR, where R is a positive integer denoting the number of queues. Those skilled in the art will understand and appreciate that there can be any number of one or more output queues 214. Each queue (or group of queues) can be assigned a respective priority level that will determine its priority for being forwarded to an associated network 216 by flow control 218. Additionally, the number of queues 214 can be fixed or it can be dynamically adjusted, such as by an associated business system 220.

The flow control 218 thus can forward data packets from the respective queues 214 according to the pre-assigned priority level associated, with each of the respective queues. For example, each queue can be assigned a predetermined portion of the available output bandwidth from the router 200. A higher priority queue (or queues) 214 may be assigned a larger portion of the available bandwidth to ensure that data packets placed into such higher priority queues are forwarded accordingly. It is to be understood and appreciated that the flow control 218 can further be programmed to dynamically modify the priority for each of the respective queues (as well as the bandwidth allocated for such queues) such as is based on instructions from the business system 220. In this way the flow control 218 can forward packets from the queues to maintain an output bandwidth according to available resources and user demands.

As described herein, the business system 220 can also dynamically modify the rules for routing program content in way to optimize network resources and revenue within the overall system. When rules change for routing data, the business system 220 can also update the EPG 224 at the at the set top boxes 226 for each of the plurality of subscribers. Changes to die EPG 224 can be provided as control instructions that can propagated to the set top boxes 226 via the network 216, such as can be sent through an appropriate queue 214 according to its pre-assigned priority (e.g., according to predetermined content or metadata). Alternatively, separate bandwidth in the network 216 can be maintained for distributing control information, such as EPG control instruction data to the set top boxes 226.

Figure 6:
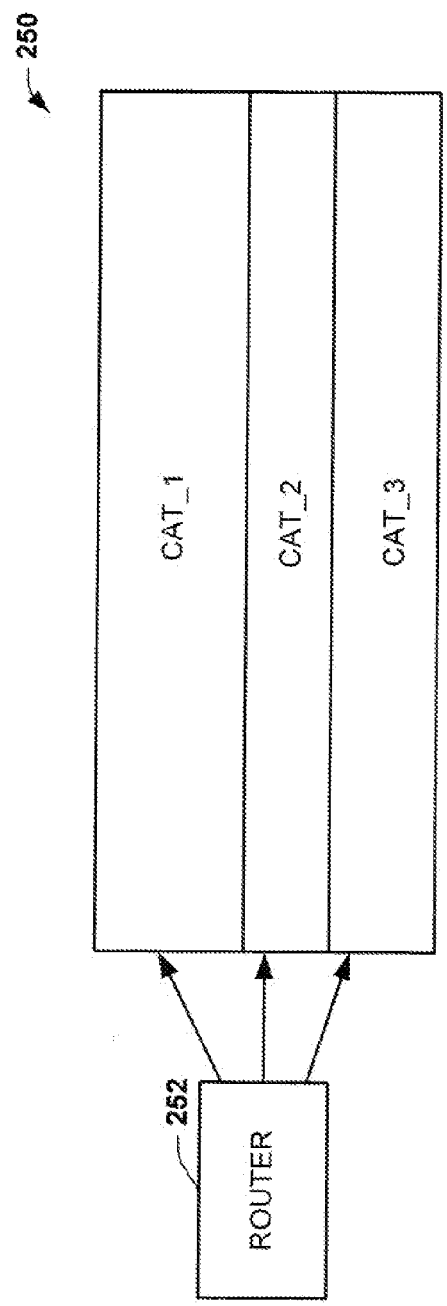
FIG. 6 depicts an example of a bandwidth allocation scheme that can be utilized for content-based routing according to an aspect of the invention.

FIG. 6 depicts a schematic example of a data pipeline 250 for distributing media content from a router 252. The router 252 can forward data packets over a predefined bandwidth of the pipeline 250, which may vary according to system resources and infrastructure. The bandwidth of the data pipeline 250 from the router 252, for example, can be effectively divided so that different predefined categories of program content are allocated to corresponding portions of the available bandwidth. In the example of FIG. 6, it is assumed that three categories, of data packets CAT_1, CAT_2 and CAT_3 are allocated to the available bandwidth in the pipeline 250. For instance, each category of data packet, which is defined by content in the respective packets, is provided to a respective output queue (or group of queues) associated with a corresponding portion of the available bandwidth.

Each, stream of a given program, according to its category, may occupy the same bandwidth. In the example of FIG. 6, more bandwidth is allocated to CAT_1 than to the other categories. The particular allocation of bandwidth and categories can vary according to various revenue optimization schemes derived by the business system. For instance, the relationship between the bandwidth allocation for a given category can be determined by a business system, such as may employ a bandwidth broker. The router 252 further can include a flow control that includes a bandwidth allocation agent and load balancing to ensure that the data pipeline 250 is adequately utilized for distributing program content to subscribers. It will be understood and appreciated that the bandwidth allocation for a given category further can be dynamically adjusted, such as in response to control instructions from a corresponding business system. For example, if demand of a given category of program increases, bandwidth allocation for such category further can be adjusted commensurate with such changes in demand.

Figure 7:
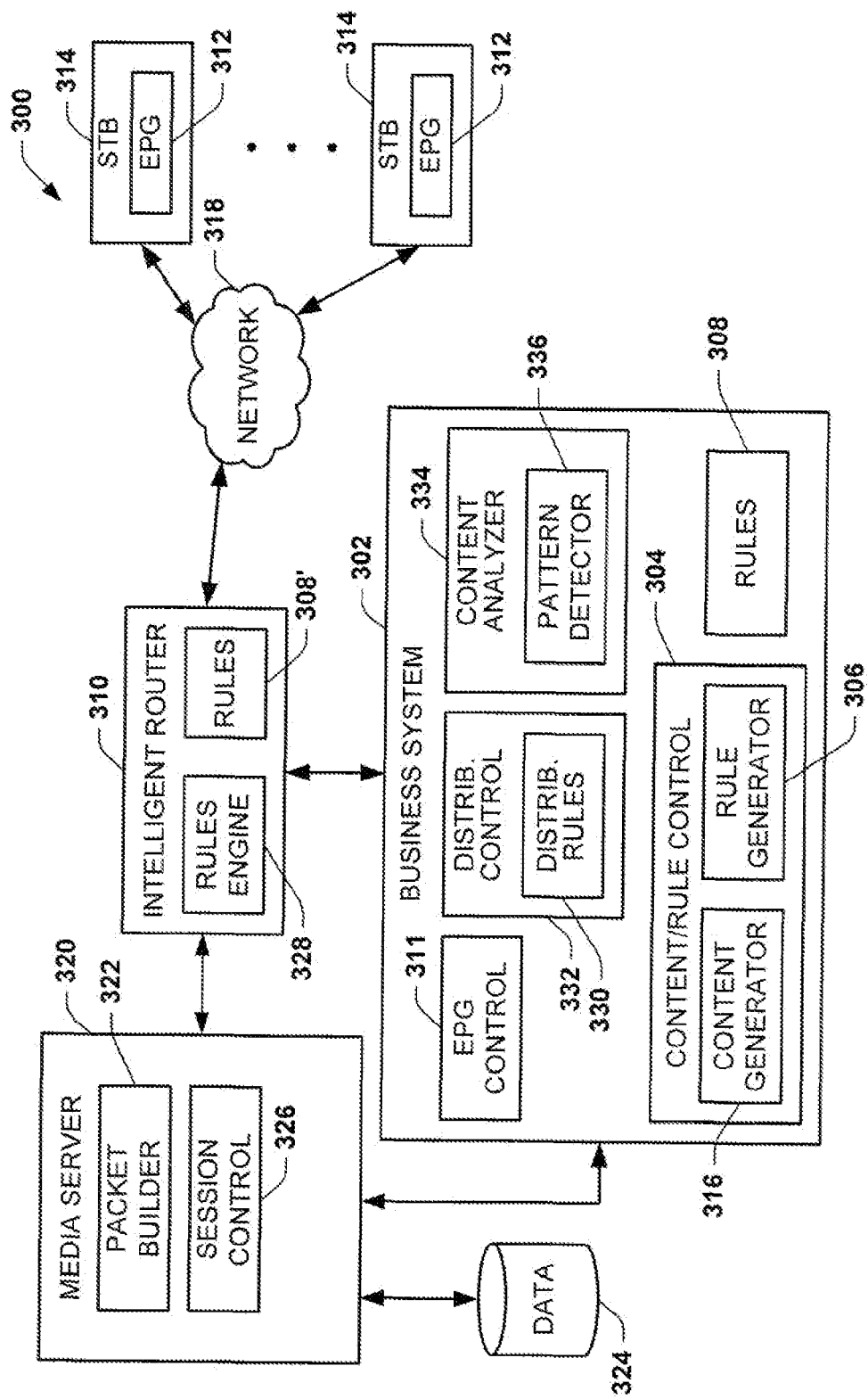
FIG. 7 depicts an example embodiment of business features that can be utilized in a system employing content-based routing according to an aspect of the invention.

FIG. 7 depicts an example of a system 300 that can be utilized for implementing content based routing according to an another aspect of the invention. Similar to the other examples described herein, the system 300 includes a business system 302 that is programmed to control the overall operation of the system 300 for a service provider. For instance, the business system can implement functions and methods designed to control resource utilization and distribute program content to achieve a defined business objective.

The business system 302 includes a content/rule control 304 that includes a rule generator 306 that is programmed to generate one or more rules 308 consistent with the business objective. As described herein, a copy of all or some of the rules 308 are provided to an intelligent router 310 (the rules in the router being indicated at 308') for implementing content-based routing. The business system 302 and the content/rule control 304 thereof can dynamically modify the rules based upon the circumstances within the system 300, such as to optimize resources and increase revenue within the system. As rules might change or categories of program that can be distributed in the system 300 might change, the business system 302 also includes an EPG control 311 that is programmed to populate changes to an EPG 312 at subscriber set top boxes 314. Alternatively, the EPG control 311 can be implemented as a separate system or subsystem associated with managing the EPG and other subscriber-related functionality.

The content/rule control 304 also includes a content generator 316 that is utilized to provide metadata for identifying each of a plurality of categories of data packets, based on which metadata the intelligent router 310 applies one or more of the rules 308 to perform the content-based routing. For example, each category can be associated with a different level of priority for forwarding data packets from the router 310 to a network 318 for streaming media content to the subscribers set top boxes 314.

As described herein, the content or metadata can be provided to a media server 320. A packet builder 322 inserts the metadata into each data packet (e.g., into a header of the network or transport layer) according to the category of each program as determined by the business system 302. As described herein, the business system 302 can provide assignment data with the metadata to define how to apply the metadata to the media content stored in the media server 320. The media server 320 thus obtains the program data from a data store 324 and in turn provides the data packets to the intelligent router 310 based upon selections at the set top boxes 314. Each data packet received by the router 310 thus includes predetermined metadata based on which the content-based routing can be performed.

Each session for distributing a piece of program from the media server 320 to a respective set top box 314 is controlled at the multimedia server by session control module 326. The session control module 326, for example, employs a session ID, which may also be inserted into the respective packets (e.g., see FIG. 3), to facilitate the streaming of the programming from the media server 320 to the set top boxes 314.

The intelligent router 310 includes a rule engine 328 that is operative to employ the rules 308' for prioritizing queuing and forwarding the respective data packets from the router to the network 318 provided by the media server 320. The rules 308' employed by the router 310 may also include one or more distribution rules 330 that are provided by a distribution control component 332 of the business system 302. The distribution control component 332, for example, can generate the distribution rules that are employed by the router 310 for allocating resources and bandwidth for the respective categories. The distribution control 332 further can employ the distribution rules 330 to control the manner in which data is distributed, such as unicast streaming, a multicast streaming or a broadcast streaming, based on applying the distribution rules to the metadata in the data packets. The router 310 can employ the rules 308' for cooperatively controlling both routing and distribution of data packets from the router to the respective set top boxes 314. The distribution control 332 can dynamically modify the distribution rules 330 based upon demand for a given program and available resources in the system.

By way of further example, the system 300 may include a content analyzer 334. In the example of FIG. 7, the content analyzer 334 is shown as being implemented as part of the business system 302. Alternatively, the content analyzer 334 might be implemented as part of the router 310 or it can be implemented in a distributed manner in both the router and the business system 302. The content analyzer 334 is programmed to analyze the content in the data packets that pass through the router 310. The content being analyzed can include metadata generated by the content generator 316 as well as data in other fields of the data packets. For example, the content analyzer 334 can analyze the content in data packets to ascertain a level of demand for each of the programming being distributed in the system 300. The content/rule control 304 can employ the analysis of such demand to implement changes to the rules 308, such as to control how different categories of data packets are queued. Additionally or alternatively, the distribution control 332 can employ the results of the content analysis to modify the distribution rules to change how a respective category or how a particular program is distributed in the system 300.

As one example, if the content analyzer 334 determines that demand for a given program exceeds a predefined threshold number of streams for a given program (e.g., 10,000 streams), the content analyzer can trigger the distribution control 332, based on the distribution rules 330 provided by the business system 302, to change from unicast streaming to multicast or broadcast streaming. With the implementation of such changes to the distribution of content, the EPG control 311 can update the EPGs 312 for the subscribers accordingly.

For instance, the content analyzer 334 may include a pattern detector 336 that is operative to detect one or more defined patterns in content distribution or program demand, such as for different time periods. The pattern detector 336 thus can determine patterns in program content being distributed as well as patterns associated with program demand by one or more subscribers, including aggregate subscriber demand for particular program content. The pattern detector 336 may also determine viewing habits for individual subscribers or subscribers in the aggregate. In response to detecting any one or more such patterns, the distribution control 332 and EPG control 311 can adapt to expected changes in current demand or anticipate future demand, such as by adjusting the manner in which content is available for distribution to the set top boxes 314. Additionally or alternatively, the rules 308' can be modified by the rule generator 306 to accommodate expected changes in demand or adjust the rules in real time based upon actual patterns detected based on the content in the data packets. It will be appreciated that more sophisticated patterns can be ascertained by programming the router 310 to extract more content in the data packets than just the predetermined content or metadata mat may be inserted. It will be appreciated that any amount of content in each data packet can be extracted and provided to the content analyzer 334 for appropriate analysis.

As another example, in response detecting a high increase in demand (or an expected increase in demand) for a given program at one or more particular category, the business system 302 can increase the cost for receiving the given program to accommodate the increase in demand or to accommodate an expected increase in-demand. Corresponding changes can also be made to the content-based routing rules 308 and to the distribution rules 330 to accommodate changes in demand. By contrast, as demand for a given program decreases, the distribution rules 330 and rules 308 associated with program and/or category can be adjusted to reflect a de-escalation in price associated with the decline in demand. As a further example, in a bandwidth limited scenario for a given program, a Dutch auction (or an inverse Dutch auction) can be implemented by dynamically adjusting the cost for a given program commensurate with demand for the program. Such a feature added flexibility for new program offering, such as recently released movies as well as other programs that may be distributed in real time.

In view of the foregoing examples and embodiments, those skilled in the art will understand and appreciate various other features and functionality that can be enabled by implementing content-based routing. As a result of implementing content-based routing, the system 300 can implement various different types of economic models to optimize revenue as well as optimize resources within the system. Additionally, such an approach enables the actual infrastructure for the system 300 to operate more efficiently than many traditional systems that tend to be configured to accommodate worst case traffic scenario. Moreover, as new content is added to the offerings provided by the multimedia server 320, additional rules 308 can be implemented by the business system 302 assigning the predetermined content categories to the new programs. Alternatively, new categories can also be added for new program content. Thus, the rule based content routing approach described herein enables a provider better control of physical resources revenue as well as network resources.

In view of the structural and functional features described above, certain methods will be better appreciated, with reference to FIGS. 8 and 9. It is to be understood and appreciated that the illustrated actions, in other embodiments, may occur in different orders or Concurrently with other actions. Moreover, not all features illustrated in FIGS. 8 and 9 may be required to implement a method according to the subject invention. It is to be further understood that the following methodology can be implemented in hardware (e.g., one or more processors, such as in a computer or computers), software (e.g., stored in a computer readable medium or as executable instructions running on one or more processors), or as a combination of hardware and software.

FIG. 8 is a flow diagram depicting a method 400 that can be utilized to manage metadata that is provided in a data packet for enabling content-based routing according to an aspect of the invention. The method 400 begins at 402 in which categories and content (e.g., metadata) are defined. The types and number of categories, as well as their meaning within the system can vary according to system requirements and business objectives within the system. The particular content (e.g., the number of bits, their values) also can vary to implement the corresponding business objective. Based upon the categories and content, one or more rules can be generated at 404. The rules are utilized to control the content-based routing. Any number of one or more rules can be utilized to implement a desired prioritization, as well as control the distribution of data packets in the system.

At 406, the content is assigned to the media at a source of media information content. The content, for instance, can correspond to metadata and be assigned to media information content according to pre-defined assignment schedule, such as may be determined, by a corresponding business system. The assignment schedule can be data that defines to which media information (e.g., which programs) the content or metadata are assigned, which can vary based on one or more business objectives. At 408, the content (e.g., metadata) is inserted into the data packets for the media in accordance with the assignment defined by the business system. From 408, the method can return to 402, indicated schematically at 410, in which rules and content can be modified such as shown and described herein.

FIG. 9 depicts a flow diagram of a method 450 for implementing content-based routing that can be implemented according to an aspect of the invention. The method 450 begins at 452 in which a data packet is received. The particular protocol and size of packet can vary according to system requirements and application guidelines. At 454, content in the packet is extracted. The content can correspond to one or more predetermined fields that are to be analyzed and evaluated to enable the content-based routing. The content can be inserted into the data packet as metadata or correspond to one or more predefined field thereof.

At 456, one or more rules are applied to the extracted content. The rules can be defined by a business system (e.g., according to metadata generated for the system) to enable content-based routing, such as including forwarding data packets according to a predetermined category that is defined by the content evaluated and extracted at 454. At 458, the data packet is buffered for delivery from the router according to the rule applied at 456. The application of the rule to the predetermined content (or metadata) determines a given category of the dam packet and the category, in turn, defines which queue of a corresponding output buffer the packet is placed. At 460, the packets are forwarded from the output buffer according to the category. The router can also employ bandwidth allocation and flow control to further manage system resources. From 460, the method proceeds to 462 in which the next packet is processed accordingly.

From the foregoing, those skilled in the art will appreciate various contexts and applications in which the systems and methods for content-based routing can be utilized. For example, the business system and components thereof (e.g., resource manager 112) further can be programmed to optimize revenue, to optimize resource allocation and/or to optimize utilization of bandwidth in the system. It will be further appreciated that while systems and methods described herein are particularly useful in a constrained network, the systems and methods are generally applicable to a variety of resource circumstances.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A system to route media information content comprising:
   a router that analyzes predetermined content of each of a plurality of data packets of the media information content corresponding to a given program that has been requested by at least one user and prioritizes forwarding each of the plurality of data packets from the router to each respective user based on applying at least one rule to the predetermined content;
   a programmable rule generator that is configured to generate the at least one rule based on an aggregate user demand for the given program and available resources to achieve at least one business objective, the router ascertaining a category for each of the plurality of data packets based on the analysis of the predetermined content by the router; and
   a business system that analyzes the predetermined content to ascertain the aggregate user demand for the media information content corresponding to the given program by at least one of user and resource utilization in the system, wherein the programmable rule generator dynamically modifies the at least one rule based on the analysis by the business system.

2. The system of claim 1, further comprising a rules engine programmed to apply the at least one rule to the predetermined content of each of the plurality of data packets to determine a prioritization in an output buffer for each data packet the router forwarding each of the plurality of data packets according to the prioritization determined by the rules engine.

3. The system of claim 2, wherein the output buffer comprises a plurality of output queues, the system further comprising:

a queuing control component configured to send each of the plurality of data packets to one of the plurality of output queues based on control instructions that define the prioritization in the output buffer.

4. The system of claim 2, wherein the rules engine employs the at least one rule to establish a prioritization hierarchy for forwarding the plurality of data packets from the router according to the category thereof.

5. The system of claim 1, further comprising a content analyzer programmed to analyze at least the predetermined content of the plurality of data packets, the content analyzer determining a condition associated with demand for each category of the media information content provided to the router for distribution in the system, the rule generator employing the condition determined by the content analyzer to dynamically modify the at least one rule.

6. A system to route media information content comprising:
 a router that analyzes predetermined content of each of a plurality of data packets of the media information content that has been requested by at least one user and prioritizes forwarding each of the plurality of data packets from the router to each respective user based on applying at least one rule to the predetermined content;
 a programmable rule generator that is configured to generate the at least one rule based on user demand for the media information content and available resources to achieve at least one business objective, the router ascertaining a category for each of the plurality of data packets based on the analysis of the predetermined content by the router;
 a business system that analyzes the predetermined content to ascertain the user demand for the media content by the at least one user and resource utilization in the system, wherein the rule generator dynamically modifies the at least one rule based on the analysis by the business system; and
 an electronic program guide control programmed to send program instructions to update an electronic program guide for a plurality of users, in response to and commensurate with the at least one rule being modified, to facilitate selection and receipt of desired media information content forwarded from the router to the respective users.

7. The system of claim 1, wherein the predetermined content comprises metadata inserted into each of the plurality of data packets, the router applying the at least one rule to the metadata to prioritize the forwarding each of the plurality of data packets from the router.

8. The system of claim 7, further comprising a content generator operative to generate the metadata to define at least two different predetermined categories of the media information content corresponding to the given program, the metadata being inserted into the plurality of data packets to assign the media information content to at least one category of the at least two different predetermined categories.

9. The system of claim 8, wherein the at least one rule contains instructions to enable the router to ascertain which of the at least two different predetermined categories each of the plurality of data packets has been assigned according to the metadata in each respective data packet, the router forwarding the plurality of data packets according to which of the at least two different predetermined categories is associated with each of the plurality of data packets identified by the metadata thereof.

10. The system of claim 1, wherein the media information content comprises multimedia data provided to the router as a stream of the plurality of data packets from a source of multimedia data in response to selection by at least one user.

11. A system to route media information content comprising:
 a router that analyzes predetermined content of each of a plurality of data packets of the media information content and determines a prioritization for forwarding each of the plurality of data packets from the router based on applying at least one rule to the predetermined content, in response to a request for a selected program of the media information content by at least one downstream user, the router forwarding each of the plurality of data packets of the selected program according to the prioritization; and
 a pattern detector that analyzes the predetermined content extracted from a plurality of data packets to ascertain a pattern in the demand of the plurality of users over a period of time for the media information content that is distributed to the at least one user, the router controlling how media information content is streamed from the router to at least a portion of a plurality of users based on the pattern detected by the pattern detector;
 wherein the media information content for the selected program is provided to the router as a stream from a source of multimedia data in response to the request by at least one downstream user; and
 wherein the source of multimedia data further comprises a packet builder that inserts the predetermined content into each of the plurality of data packets according to content assignment data that is provided by a business system based on demand of a plurality of users for the selected program to achieve a business objective.

12. The system of claim 11, wherein the predetermined content comprises metadata that defines a plurality of different categories, the router further comprising a content extractor that extracts the metadata from at least one predetermined field of each of the plurality of data packets and employs the at least one rule to identify to which of the plurality of different categories each respective data packet has been assigned.

13. The system of claim 12, wherein each of the plurality of different categories is assigned a corresponding prioritization hierarchy for forwarding the plurality of data packets from the router as a stream of the media information content.

14. The system of claim 13, wherein each of the plurality of different categories represents a different value associated with forwarding the media information content from the router at the corresponding prioritization hierarchy.

15. A system to route media information content comprising:
 a router that analyzes predetermined content of each of a plurality of data packets of the media information content corresponding to a given program that has been requested by at least one user and prioritizes forwarding each of the plurality of data packets from the router to each respective user based on applying at least one rule to the predetermined content;
 a programmable rule generator that is configured to generate the at least one rule based on an aggregate user demand for the given program and available resources to achieve at least one business objective, the router ascertaining a category for each of the plurality of data packets based on the analysis of the predetermined content by the router; and
 a pattern detector that analyzes the predetermined content extracted from a plurality of data packets to ascertain a pattern in demand of the plurality of users over a period of time for the media information content that is distributed to the at least one user, the router controlling how media information content is streamed from the router to at least a portion of a plurality of users based on the pattern detected by the pattern detector.

16. The system of claim 15, further comprising a source that provides the media information content to the router as the plurality of data packets, the source and the router cooperating to switch from a first type of media streaming to a second type of media streaming for at least one program of the media information content based on an application of a distribution rule to the pattern.

17. The system of claim 16, further comprising an electronic program guide control programmed to send instructions to modify an electronic program guide for a plurality of users to enable selection and receipt of the at least one program of the media information content.

18. A system to perform content-based routing of media information content, comprising:
   a router that extracts predetermined content from each of a plurality of data packets corresponding to media information content associated with a selected program, the router employing a rules engine to apply at least one rule to the extracted predetermined content to determine an output prioritization for forwarding each of the plurality of data packets from the router to at least one user that has requested to receive the selected program of the media information content, the router forwarding each of the plurality of data packets according to the output prioritization;
   a control system that dynamically defines the at least one rule applied by the rules engine according to at least one business objective, the at least one rule being set based on user demand for the selected program and system resources, wherein the control system is further programmed to at least one of dynamically generate or change the at least one rule based on the demand for different categories of content and available resources to achieve the at least one business objective and to modify a manner of distribution for one or more of the different categories of content.

19. The system of claim 18, further comprising a source that provides the media information content to the router as the plurality of data packets, the predetermined content being inserted into each of the plurality of data packets provided by the source to define a predefined one of at least two categories.

20. The system of claim 19, wherein the control system further comprises a content generator programmed to generate the predetermined content as metadata, the metadata having a value that identifies one of the at least two categories, the metadata being inserted into the plurality data packets at the source based on an assignment data provided by the control system.

21. The system of claim 20, wherein the control system further comprises a rule generator programmed to generate the at least one rule to define the output prioritization for each of the plurality of data packets based on the metadata inserted into each of the plurality of data packets.

22. The system of claim 21, wherein the control system is programmed to cause the rule generator to dynamically modify the at least one rule based on detecting a pattern associated with at least one of the predetermined content and an aggregate subscriber demand for the selected program of the media information content over a period of time.

23. A system for performing content-based routing from a head end to a plurality of users, the system comprising:
   means for extracting predetermined content at a router at the head end from each of a plurality of data packets, each of the plurality of packets corresponding to media content associated with a given program;
   means for applying at least one rule to the extracted predetermined content to determine a category associated each of the plurality of data packets;
   means for forwarding each of the plurality of data packets from the router to respective users based on a priority assigned to the determined category; and
   means for dynamically modifying the at least one rule based on an aggregate user demand for the given program determined from an analysis of the predetermined content, based on resource utilization in the system, and based on detecting a pattern associated with at least one of the predetermined content and the aggregate user demand for the given program over a period of time.

24. The system of claim 23, further comprising:
   means for generating the predetermined content to define at least two categories of media information content;
   wherein the means for generating the at least one rule generates the at least one rule, according to the generated predetermined content, to define different levels of priority for forwarding each of the plurality of data packets from the router.

25. The system of claim 24, further comprising means for selectively inserting the predetermined content into each of the plurality of data packets according to a predefined assignment for each program of the media information content.

26. A method for performing content-based routing comprising:
   generating predetermined content to define at least two categories of media content information;
   generating at least one rule, according to the generated predetermined content, to define different categories used in routing each of the plurality of data packets according to a business objective;
   inserting the predetermined content into a plurality of data packets of the media content information at a source of the plurality of data packets;
   in response to a request by at least one user for a selected program of the media content information, receiving at a router the plurality of data packets of the media content information provided by the source, the selected program being at least one of an audio program, a video program and an audio-video program;
   extracting the predetermined content from each of the plurality of data packets of the selected program of the media content information;
   applying the at least one rule to the extracted predetermined content;
   buffering each of the plurality of data packets for delivery from the router with a priority according to a result of the application of the at least one rule;
   forwarding each of the plurality of data packets from the router to a network according to the priority; and
   sending program instructions via an electronic program guide to update an electronic program guide for the at least one users, in response to and commensurate with the at least one rule being dynamically modified, to facilitate selection and receipt of the media information content forwarded from the router to the respective at least one user.

27. The system of claim 18, further comprising:
   a source of multimedia data that provides the plurality of data packets, the source of multimedia data comprising a packet builder that inserts the predetermined content into each of the plurality of data packets according to content assignment data;

wherein the router further comprises:
an output buffer that comprises a plurality of output queues; and
a queuing control component configured to send each of the plurality of data packets to one of the plurality of output queues based on control instructions that define the output prioritization in the output buffer.

28. The system of claim 18, wherein the control system is implemented as part of a business system, the business system further comprising:
a content generator that is programmed to generate the predetermined content that is inserted into each of the plurality of data packets to establish different categories of content relevant to the at least one business objective; and
a resource manager programmed to provide instructions to at least one of the router and a source of the media information content to effect a change in how content is distributed by the router for a given one of the different categories of content.

29. The system of claim 18, wherein the manner of distribution is changed from one of a unicast and multicast distribution of content to a different one of the unicast and multicast distribution of content.

30. The system of claim 1, wherein the media information content comprises a given video-on-demand program that is available to each of a plurality of clients at two or more different cost levels, each cost level corresponding to a different prioritization category, in response to a given user requesting the given video-on-demand program having a selected one of the different cost levels, each of the data packets that is sent to the given user including the predetermined content that identifies the respective packet as having a category assigned to the selected one of the different cost levels.

31. The system of claim 1, further comprising a pattern detector that analyzes the predetermined content extracted from a plurality of data packets to ascertain a pattern in the demand of a plurality of users over a period of time for at least one audio-video program that is distributed to the respective users, the router controlling how media information content for the at least one audio-video program is streamed from the router to at least a portion of the plurality of users based on the pattern detected by the pattern detector.

32. The system of claim 11, wherein the business system comprises a user interface configured to control the predetermined content that is inserted into each of the plurality of data packets from the source of multimedia data in response to a user input.

33. The system of claim 1, wherein the router is configured to maintain a substantially constant bandwidth for each of a plurality of categories of the plurality of data packets, each of the plurality of categories corresponding to a different priority.

34. The system of claim 1, wherein the prioritization at which packets are forwarded corresponds to how quickly resources are allocated to establish a connection and a speed at which the plurality of data packets are forwarded to each respective user based on the respective category for the plurality of packets.

* * * * *